No. 616,901. Patented Jan. 3, 1899.
W. F. CORNELIUS.
INFLATABLE TIRE.
(Application filed Aug. 23, 1897.)
(No Model.)
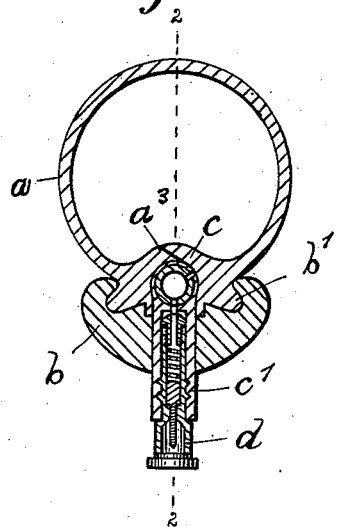
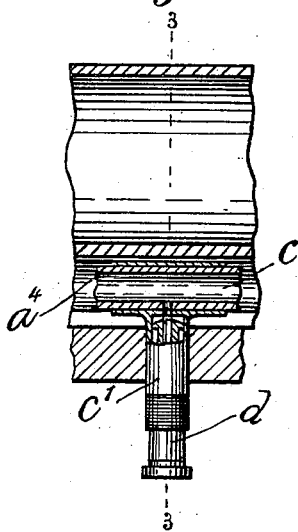
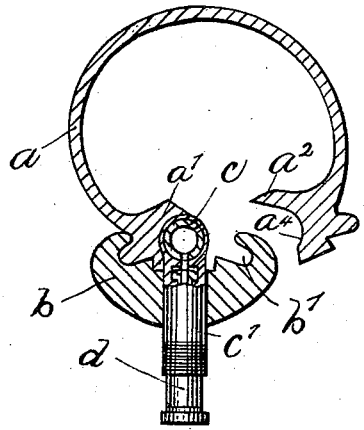
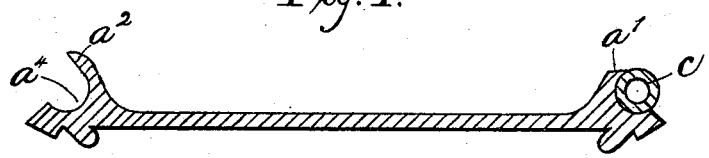
Witnesses:
Jos. W. Teetor
Jos. L. Stacy
Inventor:
Wilbur F. Cornelius
By Abs L. Teetor
Atty.

UNITED STATES PATENT OFFICE.

WILBUR F. CORNELIUS, OF INDIANAPOLIS, INDIANA, ASSIGNOR OF ONE-HALF TO WILLIAM R. BRADY, OF SAME PLACE.

INFLATABLE TIRE.

SPECIFICATION forming part of Letters Patent No. 616,901, dated January 3, 1899.

Application filed August 23, 1897. Serial No. 649,173. (No model.)

*To all whom it may concern:*

Be it known that I, WILBUR F. CORNELIUS, a citizen of the United States, residing at Indianapolis, in the county of Marion and State of Indiana, have invented certain new and useful Improvements in Single-Tube Inflatable Tires; and I do hereby declare the following to be a full, clear, and exact description of the invention, such as will enable others skilled in the art to which it appertains to make and use the same.

My invention relates to improvements in single-tube inflatable tires, which I designate as a "clincher," since it is held in place on the rim of the wheel without the use of cement, as has formerly been necessary in the use of single-tube tires; but the latter method is objectionable for several causes, chief of which are the time required to cement the tire to the rim, the difficulty of removal of the tire and making repairs, &c.

The object of my invention is to construct the tire in a peculiar and novel manner, adapted to hold itself in place by engagement with the wheel-rim, both owing to direct inflation and to the action of expansion of an auxiliary expansion and sealing tube interposed between the abutting edges of the tire proper.

To these ends my invention consists of a single-tube tire which is divided longitudinally at its inner circumference and provided with a longitudinal annular recess formed by the meeting of edges of the tire.

To enable others to understand my invention, I have illustrated fully the construction thereof in the accompanying drawings, forming a part of this specification, and in which—

Figure 1 is a transverse sectional view of rim and tire in relative position through center of this inflation-valve. Fig. 2 is a longitudinal sectional view through tire and rim and part of valve next to and connected to sealing-tube on line 2 2. Fig. 3 is a transverse sectional view, on line 3 3, of wheel rim and tire, one edge of latter being in engagement with said rim and the other edge being detached, showing mode of procedure. Fig. 4 is a transverse sectional view through expansion-tube and tire, the latter being shown in developed form.

Like letters of reference denote corresponding parts in all the figures of the drawings, referring to which—

$a$ designates my improved single-tube tire. $b$ is the rim, in which the tire is seated within the recess, $b'$ forming a dovetail, to the shape of which the tire at this point closely conforms.

$c$ is an annular elastic expansion sealing-tube.

$d$ is the valve through which air is forced into and through the sealing-tube.

$d'$ is the valve through which air is forced into and through the expanding tube, and thence into the tire proper, said expanding tube being provided with incisions at points at or near the lapping surfaces.

$a'$ and $a^2$, when in proper engagement, as at $a^3$ $a^4$, are recesses at opposite abutting edges of tire, which when placed in position, as at Fig. 1, form a suitable annular chamber for the sealing-tube $c$, which is provided with a valve-stem $c'$, to which is secured valve $d$.

I am aware that changes in form and proportion of parts and in the details of construction of the device here shown and described may be made by a skilled mechanic without departing from the spirit of my invention, and therefore I reserve the right to make such modifications as fairly fall within the scope thereof.

Having thus fully described my invention, what I claim as new, and desire to secure by Letters Patent, is—

In an inflatable tire, the combination of a casing, a longitudinal opening in said casing within the tire-site in the rim, recesses in the said rim, annular projecting flanges or beads at or near meeting edges of said casing, adapted to engage with said recesses, an expanding or sealing tube, annular recesses at inner abutting edges of said casing, conjointly forming a suitable annular chamber or receptacle for said expanding tube, inwardly-projecting annular lips or flanges adapted to overlap said expanding tube and incisions in the wall of said expanding tube adapted to emit air into the tire for the complete inflation of the latter, said incisions being so located as to be completely covered or overlapped by said inwardly-projecting lips all substantially as set forth.

In testimony whereof I affix my signature in presence of two witnesses.

WILBUR F. CORNELIUS.

Witnesses:
WM. R. BRADY,
Z. K. MCCORMACK.